United States Patent
Holmbacka (10) Patent No.: US 12,133,166 B2
(45) Date of Patent: Oct. 29, 2024

(54) ENERGY CONSUMPTION MANAGEMENT IN COMMUNICATION NETWORKS

(71) Applicant: Elisa Oyj, Helsinki (FI)

(72) Inventor: Simon Holmbacka, Helsinki (FI)

(73) Assignee: Elisa Oyj, Helsinki (FI)

( * ) Notice: Subject to any disclaimer, the term of this patent is extended or adjusted under 35 U.S.C. 154(b) by 346 days.

(21) Appl. No.: 17/639,431

(22) PCT Filed: Aug. 19, 2020

(86) PCT No.: PCT/FI2020/050540
§ 371 (c)(1),
(2) Date: Mar. 1, 2022

(87) PCT Pub. No.: WO2021/044077
PCT Pub. Date: Mar. 11, 2021

(65) Prior Publication Data
US 2022/0295394 A1   Sep. 15, 2022

(30) Foreign Application Priority Data

Sep. 2, 2019   (FI) .................................... 20195722

(51) Int. Cl.
*H04W 52/02* (2009.01)
*H04W 24/02* (2009.01)

(52) U.S. Cl.
CPC ....... *H04W 52/0206* (2013.01); *H04W 24/02* (2013.01)

(58) Field of Classification Search
CPC .......................... H04W 52/0206; H04W 24/02
(Continued)

(56) References Cited

U.S. PATENT DOCUMENTS

2010/0210255 A1*   8/2010   Amirijoo ............ H04W 74/002
                                                                   455/419
2013/0288686 A1   10/2013   Chou

FOREIGN PATENT DOCUMENTS

EP   2454910 A1   5/2012
EP   2680642 A1   1/2014
(Continued)

OTHER PUBLICATIONS

Notification of Transmittal of The International Search Report and The Written Opinion of The International Searching Authority, or The Declaration, Application No. PCT/FI2020/050540, Mailed Nov. 16, 2020, 16 pages.

(Continued)

*Primary Examiner* — Gbemileke J Onamuti
(74) *Attorney, Agent, or Firm* — Ziegler IP Law Group, LLC.

(57) ABSTRACT

A computer implemented method of energy consumption management and scheduling of cell shutdown periods in a communication network. The method includes individually scheduling daily shutdown period for certain target cells of the communication network by performing the following for each target cell: collecting usage data from a monitored cell for a first period of time, wherein the target cell and the monitored cell operate on different frequency bands and serve at least partially the same geographical area; comparing the usage data with a threshold value to determine a low-load period in the monitored cell; and scheduling a shutdown period for the target cell during the low-load period in the monitored cell.

16 Claims, 7 Drawing Sheets

(58) Field of Classification Search
USPC .......................................................... 370/311
See application file for complete search history.

(56) References Cited

FOREIGN PATENT DOCUMENTS

| EP | 3070981 A1 | 9/2016 |
|---|---|---|
| WO | 2013086939 A1 | 6/2013 |
| WO | 2015051837 A1 | 4/2015 |

OTHER PUBLICATIONS

Huawei Technologies Co et al, "Discussion on inter-RAT Energy Saving", 3GPP TSG GERAN#51, vol. TSG GERAN, No. Gothenburg, Aug. 29, 2011, XP050536772, Aug. 24, 2011, 4 pages.

Qualcomm Incorporated, "Inter-RAT Signalling for E-UTRAN Energy Saving", 3GPP Draft; R3-112608, vol. RAN WG3, No. Zhuhai ; Oct. 10, 2011, XP050542306, Oct. 1, 2011, 6 pages.

Alcatel-Lucent: "Solution proposal for differentiated energy saving strategies", 3GPP Draft; R3-132186, vol. RAN WG3, No. San Francisco; 20131111-20131115, XP050738247, Retrieved from Internet URL: http://www.3gppp.org/ftp/Meetings_3GPP_SYNC/RAN/RAN3/Docs/ , Nov. 12, 2013, 4 pages.

Finnish Patent and Registration Office, Search Report, Application No. 20195722, Mailed Apr. 4, 2020, 2 pages.

\* cited by examiner

ENERGY CONSUMPTION MANAGEMENT IN COMMUNICATION NETWORKS

TECHNICAL FIELD

The present application generally relates to energy consumption management in communication networks.

BACKGROUND

This section illustrates useful background information without admission of any technique described herein representative of the state of the art.

Communication networks comprise a plurality of cells serving users of the network. As the load in the network increases, new cells are deployed to increase capacity of the network. This results in increased energy consumption.

On the other hand, there is a constant desire to minimize energy consumption. For example, advanced chip technology, data center optimization, and power save modes are employed in communication networks in order to reduce energy consumption.

Now a new approach is provided for managing and minimizing energy consumption in communication networks.

SUMMARY

Various aspects of examples of the disclosed embodiments are set out in the claims. Any devices and/or methods in the description and/or drawings which are not covered by the claims are examples useful for understanding the disclosed embodiments.

According to a first example aspect of the present disclosure, there is provided a computer implemented method of energy consumption management in a communication network. The method comprises
  individually scheduling daily shutdown period for certain target cells of the communication network by performing the following for each target cell:
    collecting usage data from a monitored cell for a first period of time, wherein the target cell and the monitored cell operate on different frequency bands and serve at least partially the same geographical area;
    comparing the usage data with a threshold value to determine a low-load period in the monitored cell; and
    scheduling a shutdown period for the target cell during the low-load period in the monitored cell.

In an embodiment, the target cell and the monitored cell serve the same sector of a base station and the usage data is throughput data.

In an embodiment, the scheduled shutdown periods are taken into use in the target cells of the communication network.

In an embodiment, the method further comprises processing the usage data to comprise average hourly usage data for a day.

In an embodiment, the method further comprises determining a high activity interval in the monitored cell and excluding the high activity interval from the low-load period.

In an embodiment, the method further comprises determining a peak usage hour and determining the high activity interval to start a first safe guard period before the peak usage hour and to last until end of a second safe guard period after the peak usage hour.

In an embodiment, the method further comprises determining the hours with usage data not reaching the threshold as the low-load period.

In an embodiment, the method further comprises determining the low-load period to start when usage data of at least two consecutive hours fails to reach the threshold.

In an embodiment, the method further comprises determining the low-load period to end when usage data of at least two consecutive hours reaches the threshold.

In an embodiment, the first period of time is one of the following: 3 days, 1 week, 2 weeks, 3 weeks, and one month.

In an embodiment, the method further comprises periodically repeating the scheduling of daily shutdown periods.

In an embodiment, the method further comprises selecting the target cell for a certain geographical area based on effective coverage of cells in said geographical area.

In an embodiment, the method further comprises selecting the target cell for a certain geographical area so that a cell with largest coverage is excluded from being the target cell.

In an embodiment, the method further comprises selecting a lower bandwidth cell as the target cell for a certain geographical area if at least one higher bandwidth cell provides substantially the same coverage as the lower bandwidth cell.

According to a second example aspect of the present disclosure, there is provided an apparatus comprising a processor and a memory including computer program code; the memory and the computer program code configured to, with the processor, cause the apparatus to perform the method of the first aspect or any related embodiment.

According to a third example aspect of the present disclosure, there is provided a computer program comprising computer executable program code which when executed by a processor causes an apparatus to perform the method of the first aspect or any related embodiment.

The computer program of the third aspect may be a computer program product stored on a non-transitory memory medium.

According to a fourth example aspect there is provided an apparatus comprising means for performing the method of the first aspect or any related embodiment.

Different non-binding example aspects and embodiments of the present disclosure have been illustrated in the foregoing. The embodiments in the foregoing are used merely to explain selected aspects or steps that may be utilized in implementations of the present disclosure. Some embodiments may be presented only with reference to certain example aspects of the disclosure. It should be appreciated that corresponding embodiments may apply to other example aspects as well.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION OF THE DRAWINGS

Example embodiments of the present disclosure and its potential advantages are understood by referring to FIGS. 1 through 8B of the drawings. In this document, like reference signs denote like parts or steps.

The load in communication networks is not constant. The load in different cells varies e.g. depending on movements of the users and time of the day. For example, during night time some cells of the network may have very little or no load at all, but the cells consume energy also during such low-load periods.

Example embodiments of the present disclosure provide temporarily shutting down cells that are not necessarily needed for the purpose of saving energy in a communication network. There may be for example overlapping cells in different frequency bands serving at least partially the same geographical area. During low-load periods all frequency bands may not be needed for providing sufficient quality of service and therefore some of the cells serving the same geographical area are temporarily shut down. Now the question is when to shut down the cells.

Example embodiments of the present disclosure provide adaptive scheduling of shut down periods of certain cells in communication networks. Instead of using static rules that shut down certain cells e.g. during night time, shut down periods are continuously optimized on cell level. This may result in increased energy savings as static rules are usually not optimal for all cells.

In an embodiment of the present disclosure, cell shutdown period for a particular target cell is scheduled based on network usage profile in the geographical area served by the target cell. Embodiments are applicable for geographical areas that are served by at least two different cells that operate on different frequency bands. The two different cells may operate on different network technology, such as 2G, 3G, LTE 800 MHz, LTE 1800 MHz, LTE 2600 MHz, 5G. In an embodiment, shutdown period for the target cell is scheduled based on load of a monitored cell that serves at least partially the same geographical area with the target cell. Scheduling of the shutdown periods is performed individually for different cells and the scheduling is periodically updated. In this way, the shutdown periods adapt to changes in network usage profile.

In general, it can be defined that the target cell is a cell that is temporarily shut down and the monitored cell is a cell that will cover the load of the target cell during the shutdown period of the target cell. That is, according to an embodiment, the target cell and the monitored cell are different cells with at least partially overlapping coverage.

In general, cells with higher bandwidth often have smaller coverage than cells with lower bandwidth. E.g. 800 MHz cells usually cover larger area than 1800 MHz or 2600 MHz cells. In an embodiment of the present disclosure, a cell with lowest bandwidth is always kept on and one of the cells with higher bandwidth is shut down. In an alternative embodiment, the cell that is shut down is dynamically selected and the cell that is shut down can be the cell with the lowest bandwidth. This alternative is applicable especially in urban environment, where the coverage of the lowest bandwidth cells is not necessarily substantially larger than the coverage of one or more higher bandwidth cells. E.g. 800 MHz and 1800 MHz cells may have almost the same coverage in urban environment.

Figure 1:
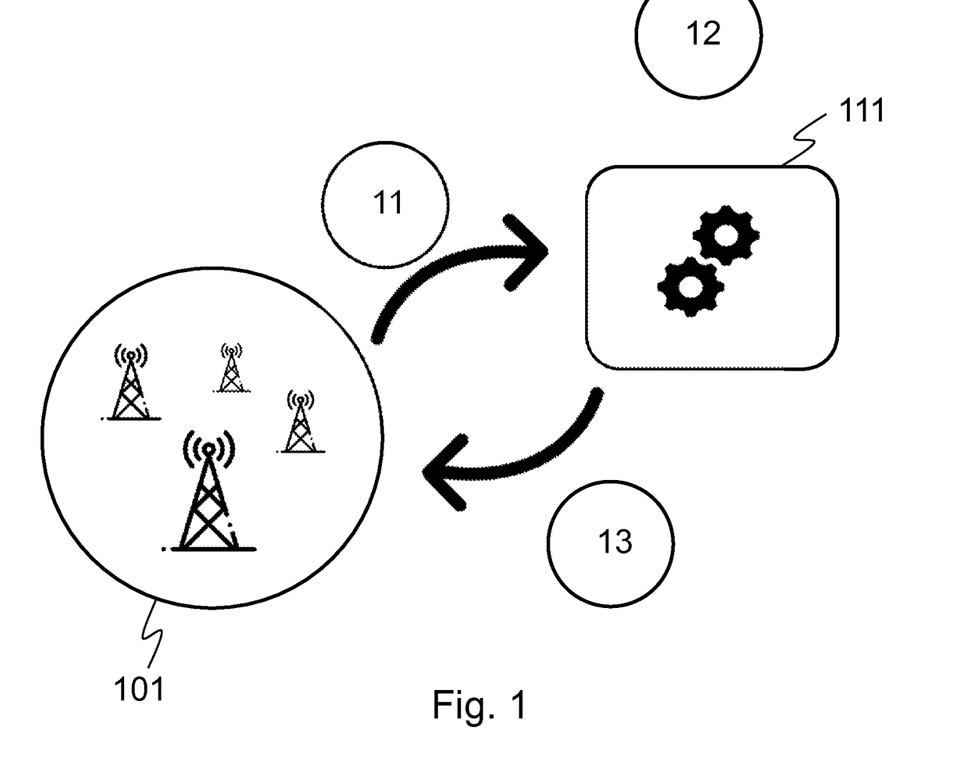
FIG. 1 shows an example scenario according to an embodiment.

FIG. 1 shows an example scenario according to an embodiment. The scenario shows a communication network 101 comprising a plurality of cells and base stations and other network devices, and an automation system 111 configured to implement automatic energy consumption management and scheduling of cell shutdown periods according to example embodiments.

In an embodiment of the present disclosure the scenario of FIG. 1 operates as follows: In phase 11, the automation system 111 starts scheduling of shutdown periods for target cells and collects usage data from monitored cells of the network. The process may be manually or automatically triggered. Additionally or alternatively, the process may be periodically repeated. The process may be repeated for example once a week, every two weeks, once a month, or every two months. By periodically repeating the process, the shutdown periods automatically adapt to changes in the network load and usage patterns.

Usage data is collected for a predefined period of time to collect sufficient data for determining usage profiles in the monitored cell(s). In an embodiment there is one monitored cell for a particular geographical location and the monitored cell naturally is different for different geographical locations. Cells of different geographical locations may be monitored in parallel. Alternatively, more than one cell may be monitored for a single geographical location. The predefined period of time may be for example 3 days, 1 week, 2 weeks, 3 weeks, one month, or some other period of time.

In phase 12, the automation system 111 uses the collected usage data to schedule cell shutdown periods for target cells. In an embodiment, a target cell selection process is performed prior to or in connection with scheduling the cell shutdown periods.

In phase 13, the scheduled shutdown periods are taken into use in the target cells of the communication network 101.

Figure 2:
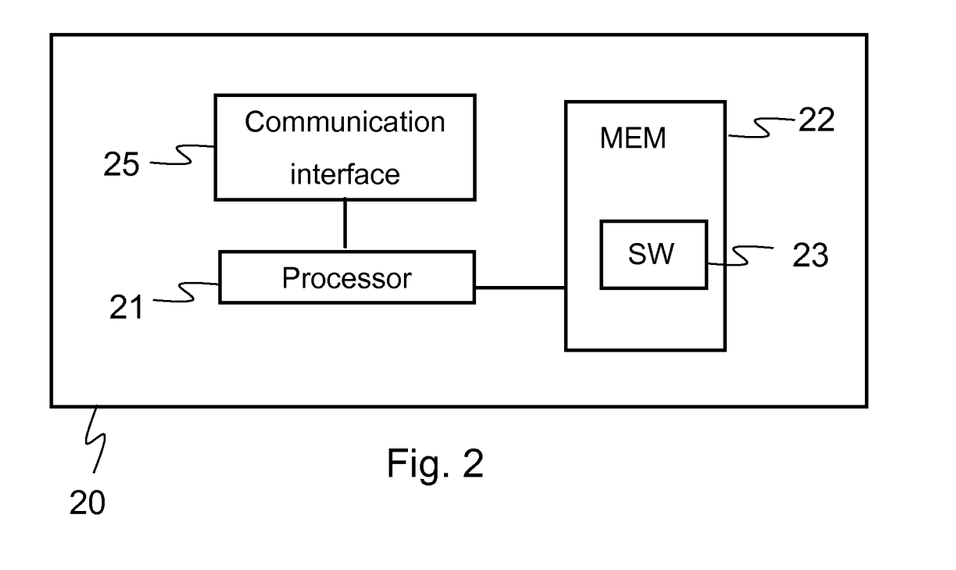
FIG. 2 shows an apparatus according to an embodiment.

FIG. 2 shows an apparatus 20 according to an embodiment. The apparatus 20 is for example a general-purpose computer or server or some other electronic data processing apparatus. The apparatus 20 can be used for implementing embodiments of the present disclosure. That is, with suitable configuration the apparatus 20 is suited for operating for example as the automation system 111 of foregoing disclosure.

The general structure of the apparatus 20 comprises a processor 21, and a memory 22 coupled to the processor 21. The apparatus 20 further comprises software 23 stored in the memory 22 and operable to be loaded into and executed in the processor 21. The software 23 may comprise one or more software modules and can be in the form of a computer program product. Further, the apparatus 20 comprises a communication interface 25 coupled to the processor 21.

The processor 21 may comprise, e.g., a central processing unit (CPU), a microprocessor, a digital signal processor (DSP), a graphics processing unit, or the like. FIG. 2 shows one processor 21, but the apparatus 20 may comprise a plurality of processors.

The memory 22 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories.

The communication interface 25 may comprise communication modules that implement data transmission to and from the apparatus 20. The communication modules may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. Further the apparatus 20 may comprise a user interface (not shown) for providing interaction with a user of the apparatus. The user interface may comprise a display and a keyboard, for example. The user interaction may be implemented through the communication interface 25, too.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like. Further, it is noted that only one apparatus is shown in FIG. 2, but the embodiments of the present disclosure may equally be implemented in a cluster of shown apparatuses.

Figure 3A:
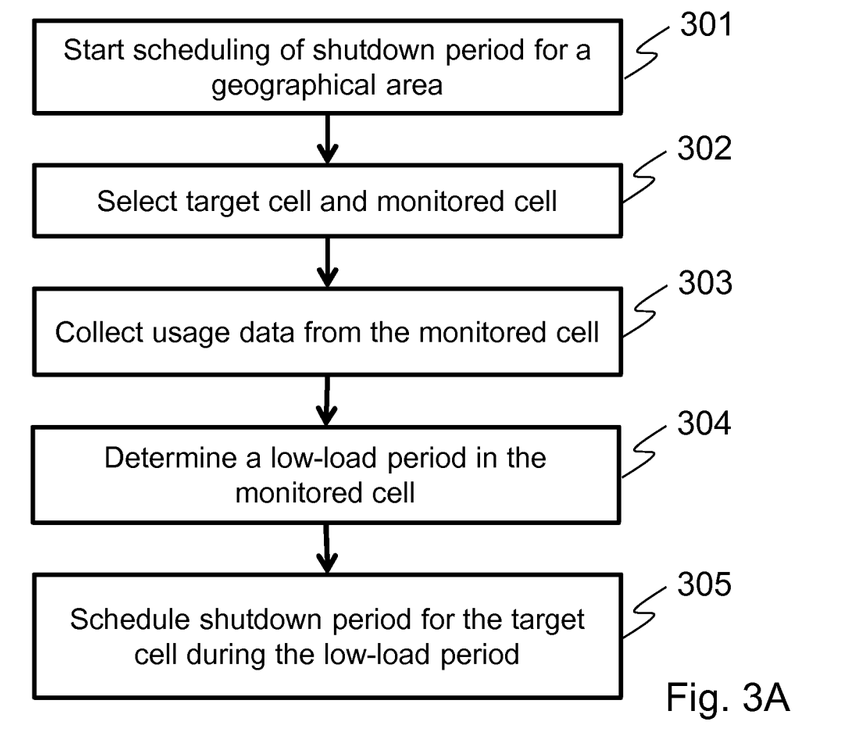
FIGS. 3A-3C show flow diagrams illustrating example methods according to certain embodiments.
Figure 3B:
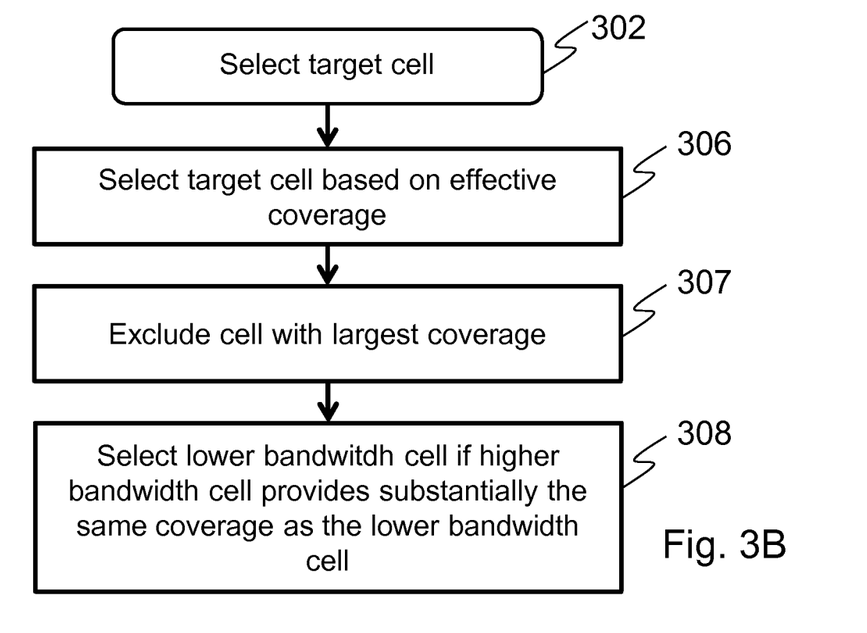
Figure 3C:
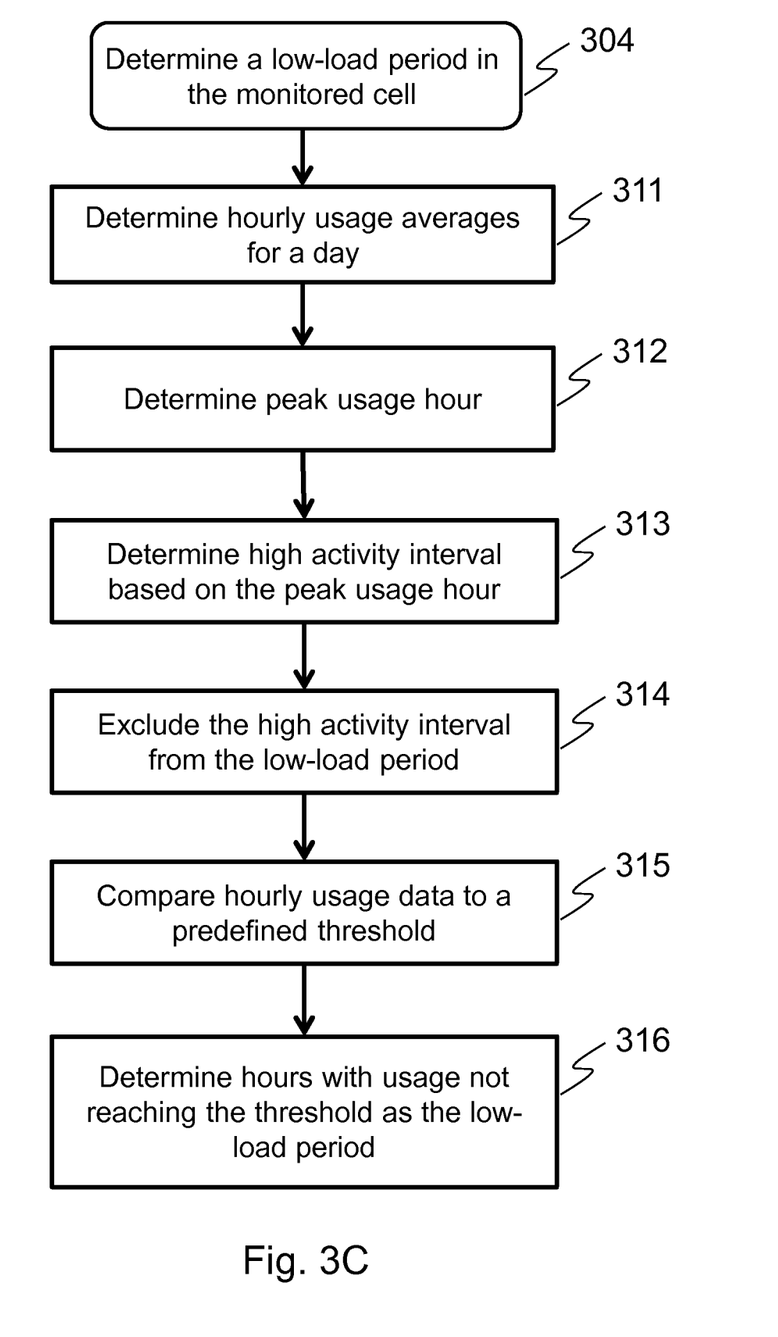

FIGS. 3A-3C show flow diagrams illustrating example methods according to certain embodiments. The methods may be implemented in the automation system 111 of FIG. 1 and/or in the apparatus 20 of FIG. 2. The methods are implemented in a computer and do not require human interaction unless otherwise expressly stated. It is to be noted that the methods may however provide output that may be further processed by humans and/or the methods may require user input to start. Different phases shown in FIGS. 3A-3C may be combined with each other and the order of phases may be changed expect where otherwise explicitly defined. Furthermore, it is to be noted that performing all phases of the flow charts is not mandatory.

The method of FIG. 3A comprises following phases:

Phase 301: Scheduling of shutdown period for a certain geographical area, e.g. for certain sector of a base station, is started. The process handles each area individually, but naturally, the process may be performed in parallel for a plurality of different areas.

Phase 302: A target cell and a monitored cell are selected. The target cell and the monitored cell operate on different frequency bands and serve at least partially the same geographical area. The target cell and the monitored cell may be for example cells serving the same sector with at least partially overlapping service area. In an embodiment, the target cell is a cell that will be temporarily shut down and the monitored cell is a cell that will cover the load of the target cell during the shutdown period of the target cell.

Phase 303: Usage data is collected from the monitored cell. Usage data may be for example throughput data or some other performance data that represents level of activity in the cell. The usage data is collected for a first period of time, which may be for example 3 days, 1 week, 2 weeks, 3 weeks, one month, or some other period of time. In an embodiment the usage data comprises the performance counters relating to amount and duration of data transmissions in the monitored cell. In an embodiment, the usage data comprises performance counters that represent the user performance in the cell such as performance counters related to throughput. In an embodiment one of more of the following counters are used: IP_TPUT_VOL and IP_TPUT_TIME, PRB_UTIL_TTI_MEAN, EFFECTIVE_CON-N_UE_AVG counters that are available in Nokia network hardware. Clearly other counters can be used depending on the implementation and depending on the network hardware that is being used. Additionally or alternatively, usage data collected directly from the user equipment can be used.

Phase 304: A low-load period in the monitored cell is determined based on the usage data. In an example embodiment this is performed by comparing the usage data to a threshold value. The threshold value may be referred to as Hit rate.

Phase 305: A shutdown period is scheduled for the target cell during the low-load period in the monitored cell.

The method of FIG. 3B concerns more detailed example of selecting the target cell for a certain geographical area. Once the target cell has been selected, one of the other cells in the geographical area is selected as the monitored cell. The method of FIG. 3B comprises following phases:

Phase 302: Selection of a target cell for a certain geographical area is started.

Phase 306: The target cell is selected based on effective coverage of cells in the geographical area. Additionally, radio conditions may be taken into account in selection of the target cell. Performance counter data obtainable from the network may be used for determining radio conditions.

Phase 307: The cell with largest coverage is excluded from being the target cell. That is, the cell with the largest coverage, which is usually the cell with the lowest bandwidth, is not shut down at all. In this way full coverage is always provided. For example, with co-located 800 MHz and 1800 MHz cells, the 800 MHz cell often has larger coverage that the 1800 MHz cell and therefore it may be safe to always select the 1800 MHz cell as the target cell.

Phase 308: A lower bandwidth cell is selected as target cell, if a higher bandwidth cell provides substantially the same coverage as the lower bandwidth cell. In this way, better throughput may be provided with similar power saving effect as lower and higher bandwidth cells can be considered to consume about the same amount of energy, even though the higher bandwidth cell provides better throughput. This alternative is often applicable in urban or dense areas with adjacent cells close to each other. In an embodiment, performance counter data, such as Reference Signals Received Power (RSRP) and Timing Advance (TA) data, collected from cells is used for determining where this approach is applicable. Certain example implementation is discussed in more detail in connection with FIGS. 5-8B.

It is to be noted that phases 306 and 307 are often alternatives to each other but both may be concurrently used in one network.

The method of FIG. 3C concerns more detailed example of determining the low-load period. The method of FIG. 3C comprises following phases:

Phase 304: Determination of the low-load period is started. The usage data collected in phase 303 of FIG. 3A is used for this purpose.

Phase 311: The collected usage data is processed to comprise average hourly usage data for a day.

In an example embodiment the usage data comprises the following performance counters: IP Throughput volume (IP_TPUT_VOL) and IP Throughput time (IP_TPUT_TIME). The processing may comprise the following steps: user throughput [Mbit/s] is defined as: (sum(IP_TPUT_VOL)/sum(IP_TPUT_TIME))/(3600*1000*1000).

Figure 4:
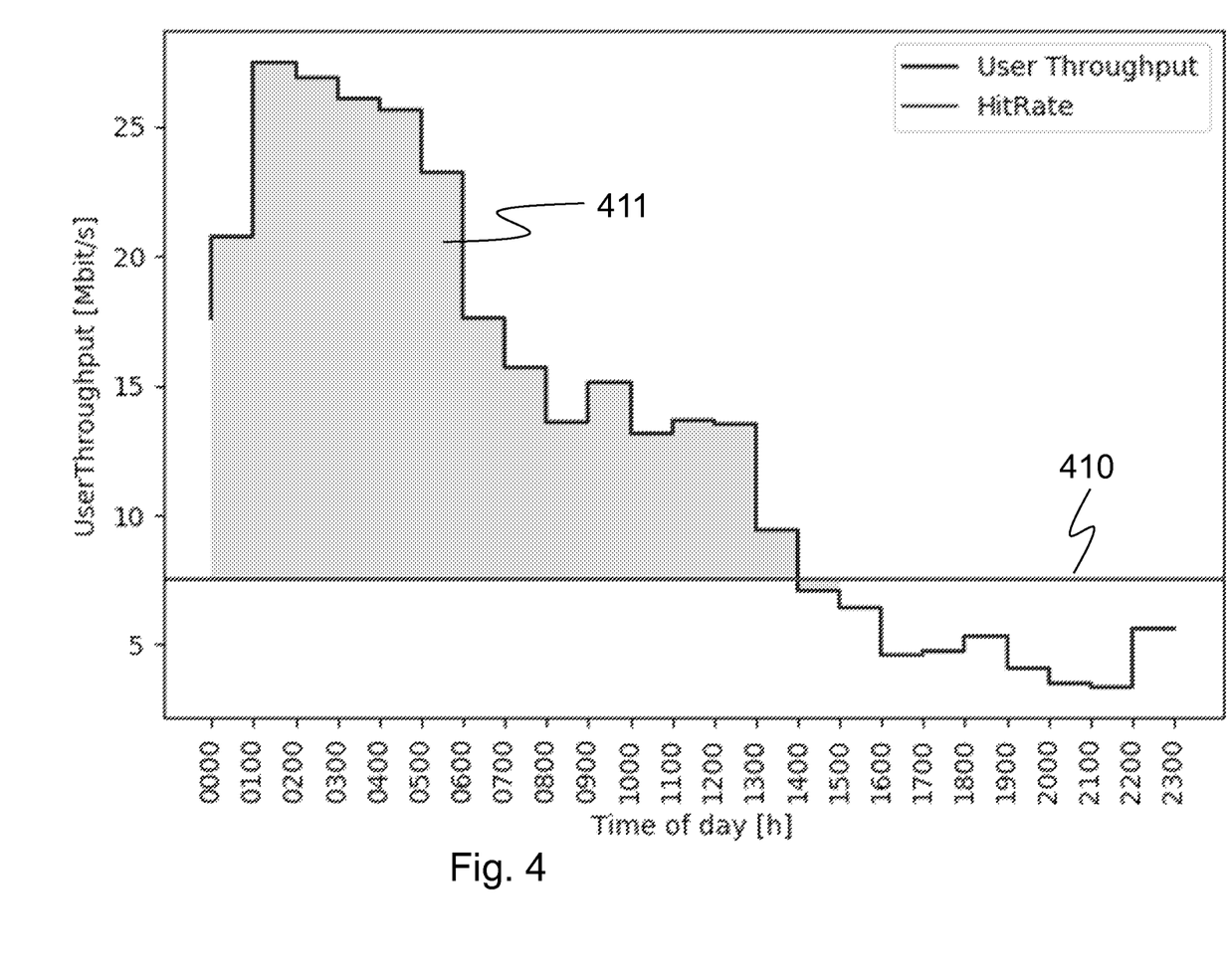
FIG. 4 illustrates average cell throughput as a function of time of day and determination of a low-load period according to an embodiment.

User throughput refers to experienced average throughput per user and thereby higher user throughput indicates lower overall usage level in the cell. The obtained user throughput data is grouped into hourly average value bins, for example 00:00, 01:00, 02:00 etc. to obtain average cell throughput as a function of time of day. FIG. 4 illustrates an example graph of such average cell throughput as a function of time of day.

Phase 312: Peak usage hour is determined. In an embodiment, this the hour with the lowest user throughput value.

Phase 313: The peak usage hour is used for determining a high activity interval in the monitored cell. In an example embodiment, the high activity interval to set to start a first safe guard period before the peak usage hour and to last until end of a second safe guard period after the peak usage hour. In an example embodiment the first and second safe guard periods are 1-5 hours long. In an example embodiment the first safe guard period is longer than the second safe guard period. In an example embodiment the first safe guard period is 3 or 4 hours and the second safe guard period is 2 hours. In another example embodiment the first safe guard period is 3 hours and the second safe guard period is 3 hours.

Phase 314: The high activity interval is excluded from the low-load period. That is, the low-load period is always set to start and end outside the high activity interval. By excluding the high activity interval from the low-load period one achieves that there will be no sudden interruptions in the service during the time of day when there is most load in the area.

Phase 315: The hourly usage data is compared to a threshold value. The threshold value may be referred to as Hit rate. The threshold may be defined as minimum desired user throughput or as minimum desired user throughput plus a safety margin. The threshold may be for example 10 Mbit/s, 12.5 Mbit/s, or 15 Mbit/s.

Phase 316: The hours with usage not reaching the threshold are determined as the low-load period. In an embodiment, the low-load period is determined to start when usage data of at least two consecutive hours fails to reach the threshold and/or the low-load period is determined to end when usage data of at least two consecutive hours reaches the threshold. In this way effects of sudden short-term changes and very short shutdown periods can be avoided. It is to be noted that not reaching the threshold may refer to usage being above or below the threshold depending on the implementation and the data that is being used to represent the usage level.

FIG. 4 illustrates a graph of average cell throughput as a function of time of day and determination of a low-load period according to an embodiment. The graph shows the average user throughput for different hours of the day. Line 410 indicates the threshold (referred to as Hit rate) used in scheduling of shutdown periods. Area 411 illustrates the low-load period in this example. In the shown example the low-load period lasts from 00:00 until 14:00. In some other examples the hours may be very different from this example. In some other cell, the low-load period may last for example from 02:00 until 05:00, or from 01:00 until 06:00, or from 01:00 until 10:00. Clearly other time periods are also possible.

Figure 5:
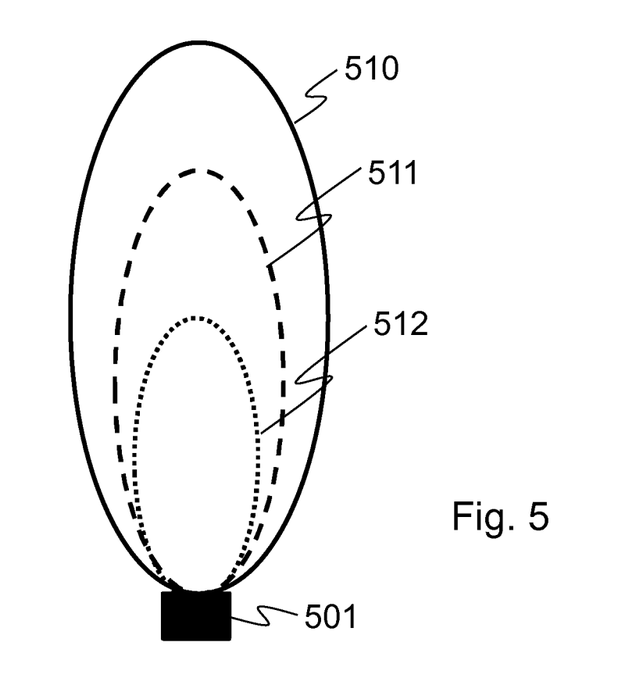
FIGS. 5 and 6 illustrate cell selection examples according to certain embodiments.
Figure 6:
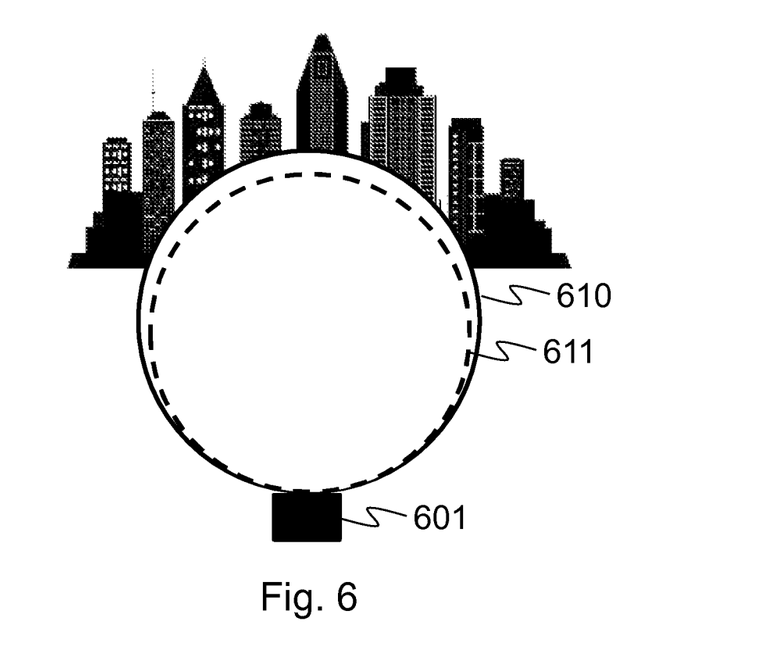

FIGS. 5 and 6 illustrate cell selection examples according to certain embodiments. FIG. 5 shows a base station 501 and three at least partially overlapping cells 510-512 in the same sector. That is, the cells serve at least partially the same geographical area.

In an example embodiment the cell 510 is an 800 MHz cell, the cell 511 is an 1800 MHz cell and the cell 512 is a 2600 MHz cell. The cells 511 and 512 have higher bandwidth than the cell 510 but smaller coverage. The coverage of cells 511 and 512 is closer to base station 501. The cell 510 has lower bandwidth but larger coverage. The coverage of the cell 510 may extend up to tens of kilometers from the base station 501.

In an embodiment, the cell 511 could be the monitored cell, and the cell 512 could be the target cell, or vice versa. In an embodiment, the cell 510 may be excluded from being selected as the target cell to ensure continuous service in the area not covered by cells 512 and 511.

FIG. 6 shows a base station 601 and two at least partially overlapping cells 610-611 in the same sector. In an example embodiment, the cell 610 is an 800 MHz cell, and the cell 611 is an 1800 MHz cell. The base station 601 operates in an urban area with many cells close to each other and therefore full coverage of the 610 cell is not needed and the effective coverage of the cells 610 and 611 is about the same. In such case, it may be beneficial to shut down the 800 MHz cell 610 instead of the 1800 MHz cell 611. It is to be noted that the coverage of the cells need not be exactly the same, but sufficiently close to each other with a sufficiently small difference or it suffices that the majority of the effective users of the cells reside in the area covered by both frequency bands. In the case shown in FIG. 6 the effective coverage of the cells 610 and 611 is substantially the same.

In an embodiment, performance data is collected from cells in the geographical area in question for a predefined period of time. The data may be collected in phase 11 of FIG. 1 or the data may be collected separately. The same way as in the phase 11 of FIG. 1, the predefined period of time may be for example 3 days, 1 week, 2 weeks, 3 weeks, one month, or some other period of time.

In an embodiment the collected performance data comprises the performance counters relating to signal power and locations of the users in the cells in the geographical area in question. In an embodiment the collected performance data comprises the following performance counters: Reference Signals Received Power bins (NUM_RSRP_MEAS_BIN_xx) and Timing Advance bins (TIMING_ADV_BIN_xx) but clearly also other counters can be used depending on the implementation and depending on the network hardware that is used.

In an embodiment, RSRP and TA histograms are created for at least two cells in the geographical area. The performance data histograms of different cells are compared to each other and threshold values to determine whether the effective coverage of the cells is sufficiently similar. If the effective coverage of the cells is sufficiently similar, the lower bandwidth cell can be selected as the target cell.

FIGS. 7A-7B and 8A-8B show example graphs illustrating target cell selection according to an embodiment. Co-located 800 MHz and 1800 MHz cells are considered. The graphs illustrate an RSRP rule and a timing advance rule. If both rules yield TRUE, it is concluded that the effective coverage of the cells is sufficiently similar, and the 800 MHz cell is selected as the target cell. Else the 1800 MHz cell is selected as the target cell.

Figure 7A:
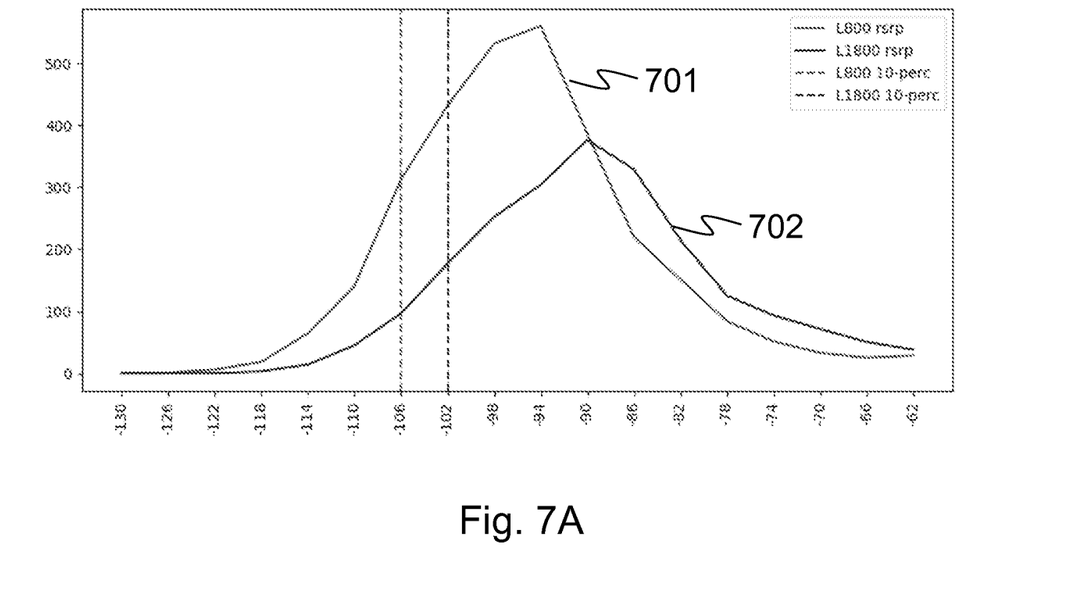
FIGS. 7A-7B and 8A-8B show example graphs illustrating target cell selection according to an embodiment.
Figure 7B:
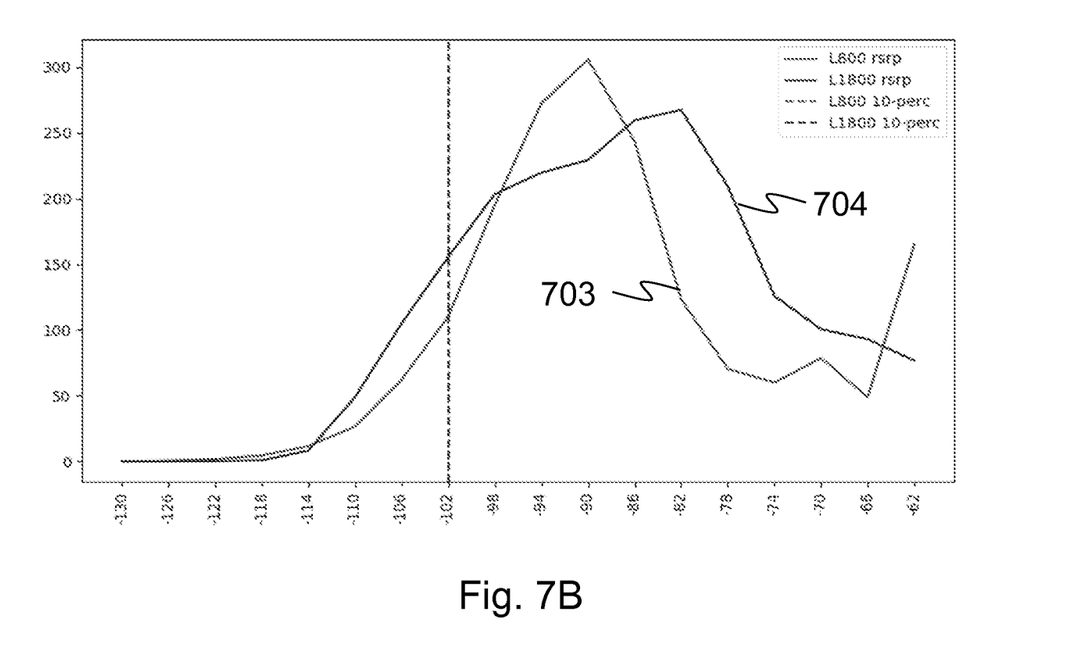

FIGS. 7A-7B show RSRP bins of the 800 MHz cell, lines 701 and 703, and the 1800 MHz cell, lines 702 and 704, in two different scenarios. In an embodiment, 10-percentile of the RSRP values is compared to a threshold. The threshold is −106 dBm in the shown example. In the scenario of FIG. 7A, 10-percentile of the RSRP value of the 800 MHz cell does not reach the threshold. That is, the RSRP rule yields FALSE, and it is concluded that the effective coverage of the cells is not sufficiently similar, whereby the 1800 MHz cell is selected as the target cell. In the scenario of FIG. 7B, 10-percentile of the RSRP value of both cells reaches (exceeds) the threshold. That is, the RSRP rule, yields TRUE, and it is concluded that the effective coverage of the cells may be sufficiently similar, if also the timing advance indicates sufficiently similar coverage.

Figure 8A:
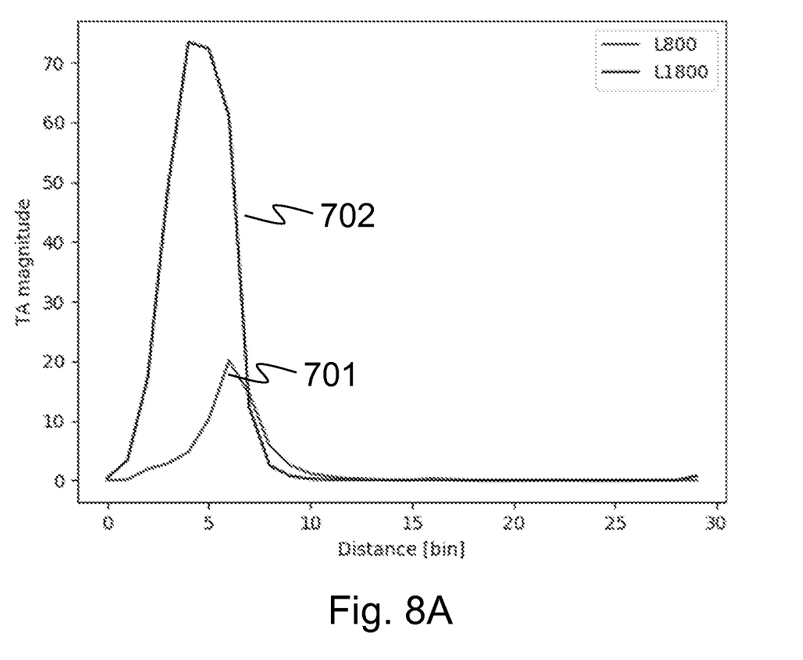
Figure 8B:
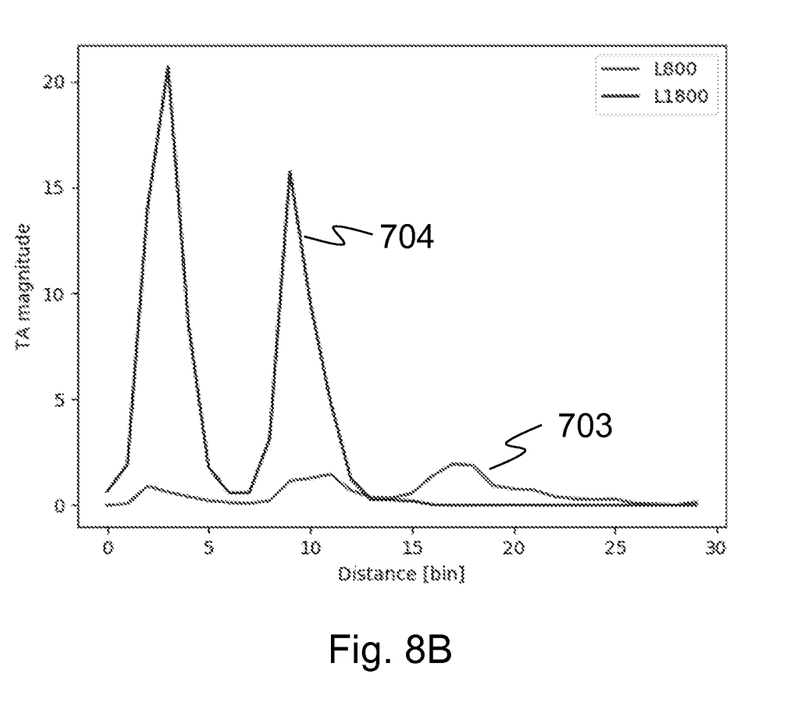

FIGS. 8A-8B show timing advance bins of an 800 MHz cell, lines 801 and 803, and an 1800 MHz cell, lines 802 and 804, in two different scenarios. Timing advance indicates location of the users of the cell in relation to the base station. The higher timing advance, the further away from the base station the user is. The timing advance histograms of the different cells are compared to each other and to a threshold to find out how much of the usage of the 800 MHz cell is outside the 1800 MHZ cell.

In an embodiment TA_ratio is defined as:

$$\frac{\sum_i \int_{ta800\_x\_i}^{ta800\_end\_i} f(ta800 - ta1800)}{\sum_i \int_{ta800\_begin\_i}^{ta800\_x\_i} f(ta800)}$$

where ta800_x is ta800 that satisfies f(ta800)=f(ta1800), and i is a crossing between f(ta800) and f(ta1800)

If TA_ratio<1, it is concluded that coverage of the 800 MHz cell is mainly inside the coverage of the 1800 MHz cell. FIG. 8A shows such scenario.

If TA_ratio>1, it is concluded that there is coverage of the 800 MHz cell outside the coverage of the 1800 MHz cell. FIG. 8B shows such scenario.

Instead of using value 1 as the limit, some other TA_ratio value can be used as the limit, too. The value of the limit may depend on how aggressively one wants to choose the 800 MHz cell over the 1800 MHz cell. The limit for the TA_ratio can be determined for example by selecting a limit at which the number of users using the 800 MHz band outside the coverage of the 1800 MHz band is significantly low to allow shutdown of the 800 MHz band without disturbing many users.

In an embodiment, TA_ratio<0.5 yields TRUE, and it is concluded that the effective coverage of the cells is sufficiently similar. Thereby, the 800 MHz cell is selected as the target cell.

Else the timing advance rule yields FALSE and the 1800 MHz cell is selected as the target cell.

The procedure of selecting the target cell may be repeated similarly to the periodic repetition of scheduling of the shutdown periods or on some other intervals.

Without in any way limiting the scope, interpretation, or application of the claims appearing below, a technical effect of one or more of the example embodiments disclosed herein is ability to dynamically optimize energy saving in communication network without substantially disturbing operation of the network.

Another technical effect of one or more of the example embodiments disclosed herein is an improved shutdown schedule for cells of communication networks.

Another technical effect of one or more of the example embodiments disclosed herein is improved user experience as cell shutdown dynamically adapts to load in the network and thereby effects to quality of service of the network can be minimized.

If desired, the different functions discussed herein may be performed in a different order and/or concurrently with each other. Furthermore, if desired, one or more of the before-described functions may be optional or may be combined.

Although various aspects of the disclosed embodiments are set out in the independent claims, other aspects of the disclosed embodiments comprise other combinations of features from the described embodiments and/or the dependent claims with the features of the independent claims, and not solely the combinations explicitly set out in the claims.

It is also noted herein that while the foregoing describes example embodiments of the present disclosure, these descriptions should not be viewed in a limiting sense. Rather, there are several variations and modifications, which may be made without departing from the scope of the disclosed embodiments as defined in the appended claims.

The invention claimed is:

1. A computer implemented method of energy consumption management in a communication network, the method comprising:
   individually scheduling daily shutdown period for certain target cells of the communication network by performing the following for each target cell:
       collecting usage data from a monitored cell for a first period of time, wherein the target cell and the monitored cell operate on different frequency bands and serve the same sector of a base station and at least partially the same geographical area, and wherein the usage data comprises throughput data;
       comparing the throughput data with a threshold value to determine a low-load period in the monitored cell; and
       scheduling a shutdown period for the target cell during the low-load period in the monitored cell; and
   taking the scheduled shutdown periods into use in the target cells of the communication network.

2. The method of claim 1, further comprising processing the usage data to comprise average hourly usage data for a day.

3. The method of claim 1, further comprising determining a high activity interval in the monitored cell and excluding the high activity interval from the low-load period.

4. The method of claim 3, further comprising determining a peak usage hour and determining the high activity interval to start a first safe guard period before the peak usage hour and to last until end of a second safe guard period after the peak usage hour.

5. The method of claim 2, further comprising determining the hours with usage data not reaching the threshold as the low-load period.

6. The method of claim 2, further comprising determining the low-load period to start when usage data of at least two consecutive hours fails to reach the threshold.

7. The method of claim 2, further comprising determining the low-load period to end when usage data of at least two consecutive hours reaches the threshold.

8. The method of claim 1, wherein the throughput data comprises performance counters relating to amount and duration of data transmissions in the monitored cell.

9. The method of claim 1, wherein the first period of time is one of the following: 3 days, 1 week, 2 weeks, 3 weeks, and one month.

10. The method of claim 1, further comprising selecting the target cell for a certain geographical area based on effective coverage of cells in said geographical area.

11. The method of claim 1, further comprising selecting the target cell for a certain geographical area so that a cell with largest coverage is excluded from being the target cell.

12. The method of claim 1, further comprising selecting a lower bandwidth cell as the target cell for a certain sector if at least one higher bandwidth cell provides substantially the same coverage as the lower bandwidth cell.

13. The method of claim 12, further comprising comparing performance data of different cells to each other and to threshold values to determine whether the least one higher bandwidth cell provides substantially the same coverage as the lower bandwidth cell.

14. The method of claim 12, wherein performance counters relating to signal power and locations of the users in the cells are used for determining whether the least one higher bandwidth cell provides substantially the same coverage as the lower bandwidth cell.

15. An apparatus comprising:
a processor; and
a memory including computer program code, the memory and the computer program code configured to, with the processor, cause the apparatus to perform:
individually scheduling daily shutdown period for certain target cells of a communication network by performing the following for each target cell:
collecting usage data from a monitored cell for a first period of time, wherein the target cell and the monitored cell operate on different frequency bands and serve the same sector of a base station and at least partially the same geographical area, and wherein the usage data comprises throughput data;
comparing the throughput data with a threshold value to determine a low-load period in the monitored cell; and
scheduling a shutdown period for the target cell during the low-load period in the monitored cell; and
taking the scheduled shutdown periods into use in the target cells of the communication network.

16. A non-transitory memory medium storing a computer program comprising computer executable program code, which when executed by a processor, causes an apparatus to perform:
individually scheduling daily shutdown period for certain target cells of a communication network by performing the following for each target cell:
collecting usage data from a monitored cell for a first period of time, wherein the target cell and the monitored cell operate on different frequency bands and serve the same sector of a base station and at least partially the same geographical area, and wherein the usage data comprises throughput data;
comparing the throughput data with a threshold value to determine a low-load period in the monitored cell; and
scheduling a shutdown period for the target cell during the low-load period in the monitored cell; and
taking the scheduled shutdown periods into use in the target cells of the communication network.

\* \* \* \* \*